United States Patent
Cariou et al.

(10) Patent No.: US 9,930,713 B2
(45) Date of Patent: Mar. 27, 2018

(54) MULTI-BAND LINK AGGREGATION SETUP FRAMES

(71) Applicant: Intel IP Corporation, Santa Clara, CA (US)

(72) Inventors: Laurent Cariou, Portland, OR (US); Bahareh Sadeghi, Portland, OR (US); Yaron Alpert, Petah Tikva (IL); Carlos Cordeiro, Portland, OR (US); Robert Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/394,288

(22) Filed: Dec. 29, 2016

(65) Prior Publication Data

US 2018/0054847 A1    Feb. 22, 2018

Related U.S. Application Data

(60) Provisional application No. 62/377,026, filed on Aug. 19, 2016.

(51) Int. Cl.
*H04W 4/00* (2009.01)
*H04W 76/02* (2009.01)
*H04W 72/04* (2009.01)

(52) U.S. Cl.
CPC ..... *H04W 76/025* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 2010/0332822 A1* | 12/2010 | Liu | ...... | H04W 12/04 713/151 |
| 2011/0065440 A1* | 3/2011 | Kakani | ...... | H04L 1/0022 455/450 |
| 2013/0266136 A1* | 10/2013 | Chu | ...... | H04K 1/003 380/34 |
| 2014/0092854 A1* | 4/2014 | Sonobe | ...... | H04L 5/08 370/329 |

* cited by examiner

*Primary Examiner* — Minh-Trang Nguyen
(74) *Attorney, Agent, or Firm* — Eversheds Sutherland (US) LLP

(57) ABSTRACT

This disclosure describes systems, methods, and devices related to link aggregation between devices. A device may encode a multi-band element for transmission using a first interface of one or more interfaces to a first device. The device may cause to send a first link aggregation setup request to the first device including at least in part the multi-band element. The device may identify a first link aggregation setup response from the first device. The device may cause to establish a multi-band link aggregation session with the first device using the first interface.

20 Claims, 10 Drawing Sheets

MULTI-BAND LINK AGGREGATION SETUP FRAMES

CROSS-REFERENCE TO RELATED APPLICATIONS

This application claims the benefit of U.S. Provisional Application 62/377,026, filed on Aug. 19, 2016, the disclosure of which is incorporated herein by reference as if set forth in full.

TECHNICAL FIELD

This disclosure generally relates to systems, methods, and devices for wireless communications and, more particularly, enhancing the performance of wireless devices by using link aggregation between these wireless devices.

BACKGROUND

Efficient use of the resources of a wireless local area network (WLAN) is important to provide bandwidth and acceptable response times to the users of the WLAN. However, often there are many devices trying to share the same resources, and some devices may be limited by the communication protocol they use or by their hardware bandwidth.

BRIEF DESCRIPTION OF THE DRAWINGS

The present disclosure is illustrated by way of example and is not limited by the accompanying drawings, in which like references indicate similar elements and in which.

DESCRIPTION

Figure 1:
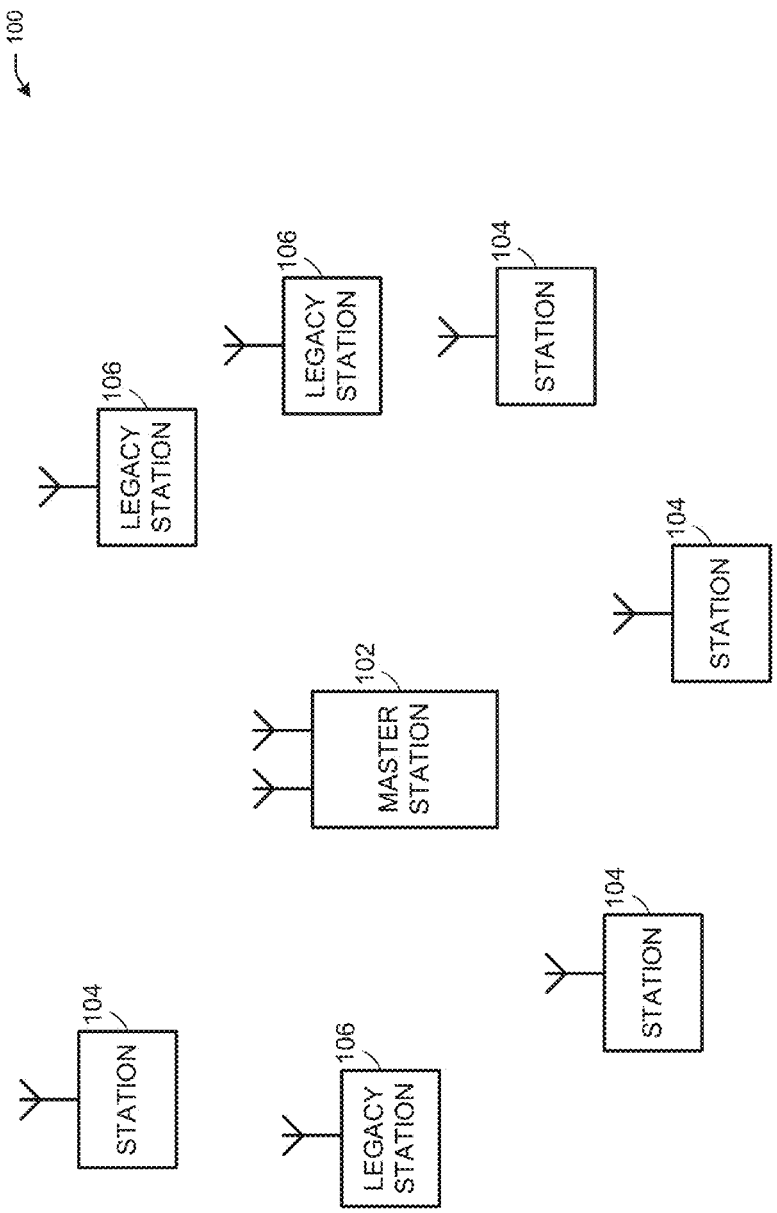
FIG. 1 illustrates a wireless local area network (WLAN), in accordance with one or more example embodiments of the present disclosure.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Example embodiments described herein provide certain systems, methods, and devices for enhancing the performance of wireless devices using link aggregation between multiple access points in various wireless networks, including, but not limited to, IEEE 802.11ax, IEEE 802.11ay, IEEE 802.11ah, or wireless based on 5G 3GPP technologies.

In the past two decades, the IEEE 802.11 WLAN networks have experienced tremendous growth with the proliferation of Wi-Fi devices used as a major Internet access scheme for mobile computing and electronic devices. Since the early deployment of IEEE 802.11 devices in both enterprise and public networks, there have only been proprietary solutions to provide coordination among access points (APs). However, such coordination is transparent to client devices, meaning that a client device, also called a station (STA), establishes a physical layer connection with only one AP at a time. That is, the STA is able to communicate with only one AP at a time for a particular communication session.

In one embodiment, a link aggregation system may provide link aggregation of data planes between different wireless air interfaces on different frequency bands (800 MHz, 2.4 GHz, 5 GHz, 60 GHz, and others).

Embodiments described herein may provide link aggregation of data planes between different wireless air interfaces on different frequency bands (800 MHz, 2.4 GHz, 5 GHz, 45 GHz, 60 GHz, and others). The link aggregation system may load-balance the traffic over two or more channels/bands/air interfaces that are sufficiently separated in frequency to permit simultaneous, independent operation, and that are non-collocated (are in different devices) at least on one side of the link. Examples may include a 800 MHz band channel and a 2.4 GHz band channel and a 5 GHz band channel, two 5 GHz band channels at opposite ends of the band, a 5 GHz band channel and a 60 GHz band channel, a 2.4 GHz band channel, a 5 GHz band channel and a 60 GHz band channel, or any other combination of channels, bands, or air interfaces.

In some embodiments, a link aggregation system may define several elements including, for example, sets of frames that may be used to share multi-band (800 MHz, 2.4 GHz, 5 GHz, 60 GHz, and others) and link aggregation capabilities (e.g., load-balancing, splitting, and merging of data packets),) or in the same frequency band within different channels, and may enable negotiating the different parameters (frequency bands, streams, policies, etc.).

In one embodiment, a link aggregation system may facilitate the splitting of data packets received into two streams of data packets. The two streams may be associated with two interfaces, such that each interface is associated with a specific frequency band. It should be noted that one interface may collect and/or accumulate two medium access control (MAC) entities that may be associated with a specific frequency band. This may be referred to as having L2 streams.

In one embodiment, a link aggregation system may facilitate load-balancing of the two L2 data streams such that packets are evenly distributed between the two interfaces or between the two L2 data streams on one interface or maybe one interface is favored over another interface based on traffic and network conditions. It may be also possible to customize the load-balancing of the two L2 data streams based on preferences.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 illustrates a wireless local area network (WLAN) 100 in accordance with some embodiments. The WLAN may comprise a basis service set (BSS) or personal BSS (PBSS) that may include a master station 102, which may be an AP or PBSS control point (PCP), a plurality of wireless STAs 104, and a plurality of legacy (e.g., IEEE 802.11b/g/a/n/ac/ad af/ah/aj) stations 106. It should be understood that the terms master station 102 and AP 102 are used interchangeably in this disclosure for ease of use.

The master station 102 may be an AP using the IEEE 802.11 protocol to transmit and receive packets. The master station 102 may be a base station. The master station 102 may be a PBSS. The master station 102 may use other communications protocols as well as the IEEE 802.11 protocol. The IEEE 802.11 protocol may be IEEE 802.11ay. The IEEE 802.11 protocol may include using orthogonal frequency division multiple access (OFDMA), time division multiple access (TDMA), and/or code division multiple access (CDMA) or combination. The IEEE 802.11 protocol may include a multiple access technique. For example, the IEEE 802.11 protocol may include space-division multiple access (SDMA), multiple-input multiple-output (MIMO), multi-user MIMO (MU-MIMO), and/or single-input single-output (SISO). The master station 102 and/or wireless STA 104 may be configured to operate in accordance with NG60, WiGiG, and/or IEEE 802.11ay.

The legacy stations 106 may operate in accordance with one or more of IEEE 802.11 a/b/g/n/ac/ad/af/ah/aj, or another legacy wireless communication standard. The legacy stations 106 may be STAs or IEEE STAs. The wireless STAs 104 may be wireless transmit and receive devices such as cellular telephones, smart telephones, handheld wireless devices, wireless glasses, wireless watches, wireless personal devices, tablets, or other devices that may be transmitting and receiving using the IEEE 802.11 protocol such as IEEE 802.11ay or another wireless protocol. In some embodiments, the wireless STAs 104 may operate in accordance with IEEE 802.11ax. The wireless STAs 104 and/or the master station 102 may be attached to a BSS.

The master station 102 may communicate with the legacy stations 106 in accordance with legacy IEEE 802.11 communication techniques. In example embodiments, the master station 102 may also be configured to communicate with wireless STAs 104 in accordance with legacy IEEE 802.11 communication techniques. The master station 102 may use the techniques of IEEE 802.11ad for communication with legacy devices. The master station 102 may be a personal basic service set (PBSS) Control Point (PCP), which can be equipped with a large aperture antenna array or modular antenna array (MAA).

The master station 102 may be equipped with more than one antenna. Each of the antennas of the master station 102 may be a phased array antenna with many elements. In some embodiments, an IEEE 802.11ay frame may be configurable to have the same bandwidth as a channel. The frame may be configured to operate over one to four 2160 MHz channels. The channels may be contiguous.

An IEEE 802.11ay frame may be configured for transmitting a number of spatial streams, which may be in accordance with MU-MIMO. In other embodiments, the master station 102, the wireless STA 104, and/or the legacy station 106 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile Communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, BLE, ZigBee or other technologies.

Some embodiments relate to IEEE 802.11ay communications. In accordance with some IEEE 802.11ay embodiments, a master station 102 may operate as a master station which may be arranged to contend for a wireless medium (e.g., during a contention period) to receive exclusive control of the medium for performing enhanced beamforming training for a multiple access technique such as OFDMA or MU-MIMO or combination. In some embodiments, the multiple-access technique used during the TxOP (transmit opportunity) may be a scheduled OFDMA technique, although this is not a requirement. In some embodiments, the multiple-access technique may be a space-division multiple access (SDMA) technique.

The master station 102 may also communicate with legacy stations 106 and/or wireless STAs 104 in accordance with legacy IEEE 802.11 communication techniques.

The wireless STAs 104, the master station 102, and/or the legacy stations 106 may be any addressable unit. It should be noted that any addressable unit might be an STA. An STA may take on multiple distinct characteristics, each of which shape its function. For example, a single addressable unit might simultaneously be a portable STA, a quality-of-service (QoS) STA, a dependent STA, and a hidden STA. The wireless STAs 104, the master station 102, and/or the legacy stations 106 may be STAs. The wireless STAs 104, the master station 102, and/or the legacy stations 106 may operate as a personal basic service set (PBSS) control point/access point (PCP/AP). The wireless STAs 104, the master station 102, and/or the legacy stations 106 may include any suitable processor-driven device including, but not limited to, a mobile device or a non-mobile, e.g., a static, device. For example, the wireless STAs 104, the master station 102, and/or the legacy stations 106 may include a user equipment (UE), an STA, an AP, a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc., may also be included in this list.

Any of the wireless STAs 104, the master station 102, and/or the legacy stations 106 may be configured to communicate with each other via one or more communications networks wirelessly or wired. The wireless STAs 104 and/or the legacy stations 106 may also communicate peer-to-peer or directly with each other with or without the master station 102. Any of the communications networks may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the wireless STAs 104, the master station 102, and/or the legacy stations 106 may include one or more communications antennas. The one or more communications antennas may be any suitable type of antennas corresponding to the communications protocols used by the wireless STAs 104, the master station 102, and/or the legacy stations 106. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the wireless STAs 104, the master station 102, and/or the legacy stations 106.

MIMO beamforming in a wireless network may be accomplished using RF beamforming and/or digital beamforming. In some embodiments, in performing a given MIMO transmission, the wireless STAs 104, the master station 102, and/or the legacy stations 106 may be configured to use all or a subset of its one or more communications antennas to perform MIMO beamforming.

Any of the wireless STAs 104, the master station 102, and/or the legacy stations 106 may include any suitable radio and/or transceiver for transmitting and/or receiving radio frequency (RF) signals in the bandwidth and/or channels corresponding to the communications protocols utilized by any of the wireless STAs 104, the master station 102, and/or the legacy stations 106 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 800 MHz channels (e.g. 802.11ah), via 2.4 GHz channels (e.g., 802.11b, 802.11g, 802.11n, 802.11ax), 5 GHz channels (e.g., 802.11n, 802.11ac, 802.11ax), or 60 GHz channels (e.g., 802.11ad), or others such as 45 GHz (e.g., 802.11aj) and 54 and 790 MHz (e.g., 802.11af). In some embodiments, non-Wi-Fi protocols may be used for communications between devices, such as Bluetooth, BLE, ZigBee, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

In example embodiments, the wireless STA 104 and/or the master station 102 are configured to perform the methods and operations herein described in conjunction with FIGS. 1, 2A-2B, 3, 4A-4C, 5A, and 5B.

Embodiments described herein provide improvements regarding next generation Wi-Fi or for 802.11ax that can involve definition of a link aggregation of data planes between different Wi-Fi air interfaces on different frequency bands (e.g., 800 MHz, 2.4 GHz, 5 GHz, 45 GHz, 60 GHz, and others) in accordance with the embodiments described herein and/or same frequency band and/or combination. For example, simultaneous dual band operation (2.4 GHz and 5 GHz) can be present in some APs on the market today, and tri-band devices may become available in the market soon. Link aggregation can also be an improvement to embodiments involving multiple air interfaces in the same band (for example, two independent IEEE 802.11ac/ax air interfaces at 5 GHz on two different 80 MHz channels).

FIGS. 2A-2B illustrate aggregation and load-balancing, in accordance with one or more example embodiments of the present disclosure.

Referring to FIG. 2A, there is shown an aggregator 201, comprising at least in part a multi-band layer 210, which may include a downlink flow control 212. The downlink flow control 212 may be a layer that may facilitate a splitting of data packets over two or more channels/bands/air interfaces. The downlink flow control 212 may be an upper MAC layer that may be in communication with lower MAC layers of one of the APs. The lower MAC layers may be associated with two or more APs. For example, the downlink flow control 212 may split the data packets and/or send packet fragments between an AP 202 and an AP 204 at their respective lower MAC layers. In this example, the AP 202 may operate using a frequency band of 5 GHz, and the AP 204 may operate using a frequency band of 60 GHz. The dataflow may arrive at the respective AP's MAC layer to be processed. For example, at the AP 202, its lower MAC layer 214 may be associated with a 5 GHz frequency band and at the AP 204, its lower MAC layer 216 may be associated with a 60 GHz frequency band.

In some embodiments, the aggregator 201 may be incorporated in one of the APs. For example, the aggregator 201 may be incorporated in AP 202 or AP 204. In other embodiments, the aggregator 201 may be a separate device, such as a controller device that may be considered as an entity that manages multiple APs having multiple coverages. The controller device may control APs that may be either collocated or not collocated. Further, the controller device may control APs configured for different frequency bands. The controller device may be configured to receive data traffic and may distribute the received data traffic to the respective AP.

In one embodiment, the AP 202 and the AP 204 may collaborate communicating with an STA 222. Typically, an STA may be able to only communicate with one AP at a time. A link aggregation system implemented on the STA 222 may enable the STA 222 to communicate with multiple APs. In this example, the STA 222 may be communicating with the AP 202 and the AP 204, such that data packets that may have been split by the aggregator 201 to the respective AP may be delivered through the respective AP to the lower MAC layers of the STA 222. The STA 222 may have one or more lower MAC layers. For example, the STA 222 may have a 5 GHz lower MAC layer 230 and a 60 GHz lower MAC layer 232 in order to communicate with the AP 202 and the AP 204, respectively. A link aggregation system may be implemented on the STA 222 in order to facilitate aggregation of the packets received on each of the lower MAC layers (e.g., layers 230 and 232). This may be performed by a multi-band layer 234, which may include a downlink reordering layer 236. The downlink reordering layer 236 may aggregate the packets received from each lower MAC layer into one packet stream. It is understood that the above descriptions are for purposes of illustration and are not meant to be limiting.

Referring to FIG. 2B, there is shown an aggregator 203, comprising at least in part a multi-band layer 240, which may include a downlink flow control 242. The downlink flow control 242 may be a layer that may facilitate a splitting of data packets over two or more channels/bands/air interfaces. The downlink flow control 242 may be an upper MAC layer that may be in communication with the lower MAC layers of the aggregator 203. The lower MAC layers may be associated with two or more channels/bands/air interfaces. For example, the downlink flow control 242 may split the data packets between a lower MAC layer 244 associated with a 5 GHz frequency band and a lower MAC layer 246 associated with a 60 GHz frequency band. The dataflow may arrive at the respective lower MAC layer to be processed. For example, at the lower MAC layer 244, process packets received from the downlink flow control 242 to be sent on a 5 GHz frequency band and the lower MAC layer 246 may process packets received from downlink flow control 242 to be sent on a 60 GHz frequency band.

In the example of FIG. 3B, the aggregator 203 may be communicating with an STA 324. A link aggregation system implemented on the STA 324 may enable the STA 324 to communicate with multiple APs. In this example, the STA 324 may receive two streams of packets that may have been split by the aggregator 203 into two streams, one using a 5 GHz frequency band and the other using a 60 GHz frequency band. The STA 324 may have one or more lower MAC layers. For example, the STA 324 may have a 5 GHz lower MAC layer 248 and a 60 GHz lower MAC layer 250 in order to be able to receive the two streams of packets and/or packets fragments from the aggregator 203, respectively. A link aggregation system implemented on the STA 324 may facilitate aggregation of the packets received on each of the lower MAC layers (e.g., layers 248 and 250). This may be performed by a multi-band layer 254, which may include a downlink reordering layer 252. The downlink reordering layer 252 may aggregate the packets received from each lower MAC layer into one packet stream. It is understood that the above descriptions are for purposes of illustration and are not meant to be limiting.

Figure 3:
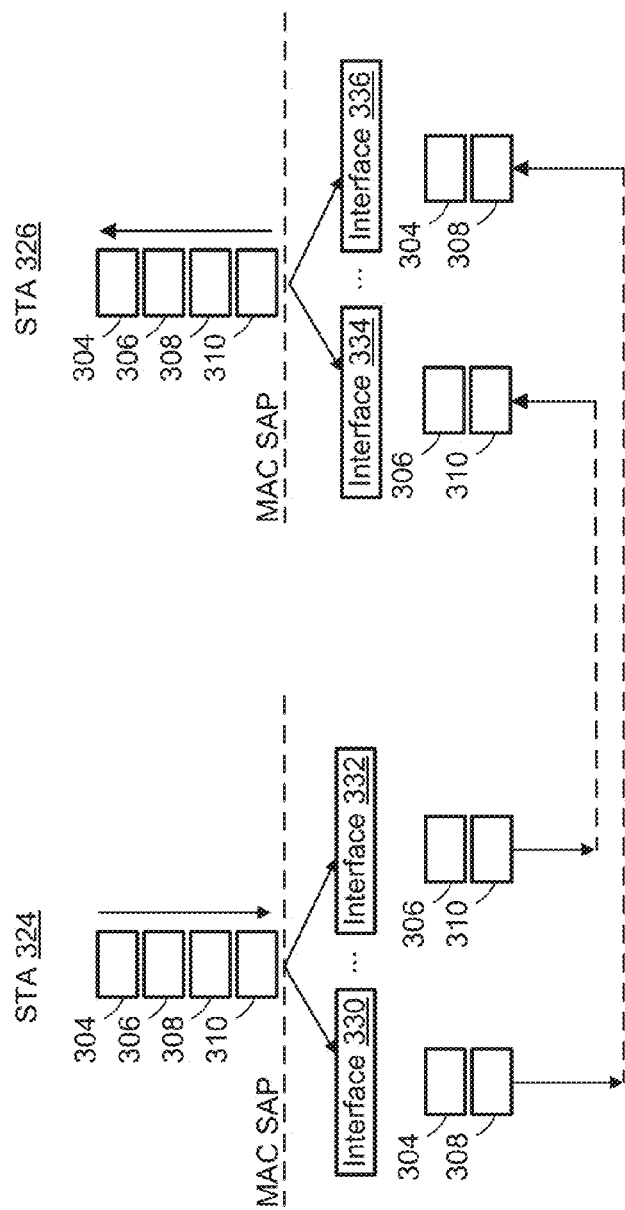
FIG. 3 illustrates load balancing on two air interfaces, in accordance with one or more example embodiments of the present disclosure.

FIG. 3 depicts an illustrative schematic diagram of load balancing on two air interfaces, in accordance with one or more example embodiments of the present disclosure.

Referring to FIG. 3, there is shown two devices (e.g., STA 324 and STA 326). The STA 324 may be a device that is transmitting data to the STA 326. In this example, the STA 324 may process packets 304, 306, 308, and 310 that may be arriving from higher layers (e.g., above the MAC layer) that are destined to the STA 326.

In one embodiment, a link aggregation system may facilitate load-balancing by splitting of data packets received into one or more streams of data packets and/or fragment a packets received into one or more streams of data packets fragments. The one or more streams may be associated with one or more interfaces, such that each interface is associated with a specific frequency band. For example, one interface may be associated with a 5 GHz frequency band, and another interface may be associated with a 60 GHz frequency band, or both interfaces may be associated with the same frequency band. It should be understood that although a 5 GHz frequency band and a 60 GHz frequency band is listed above, any other type of interface may be employed.

Figure 2:
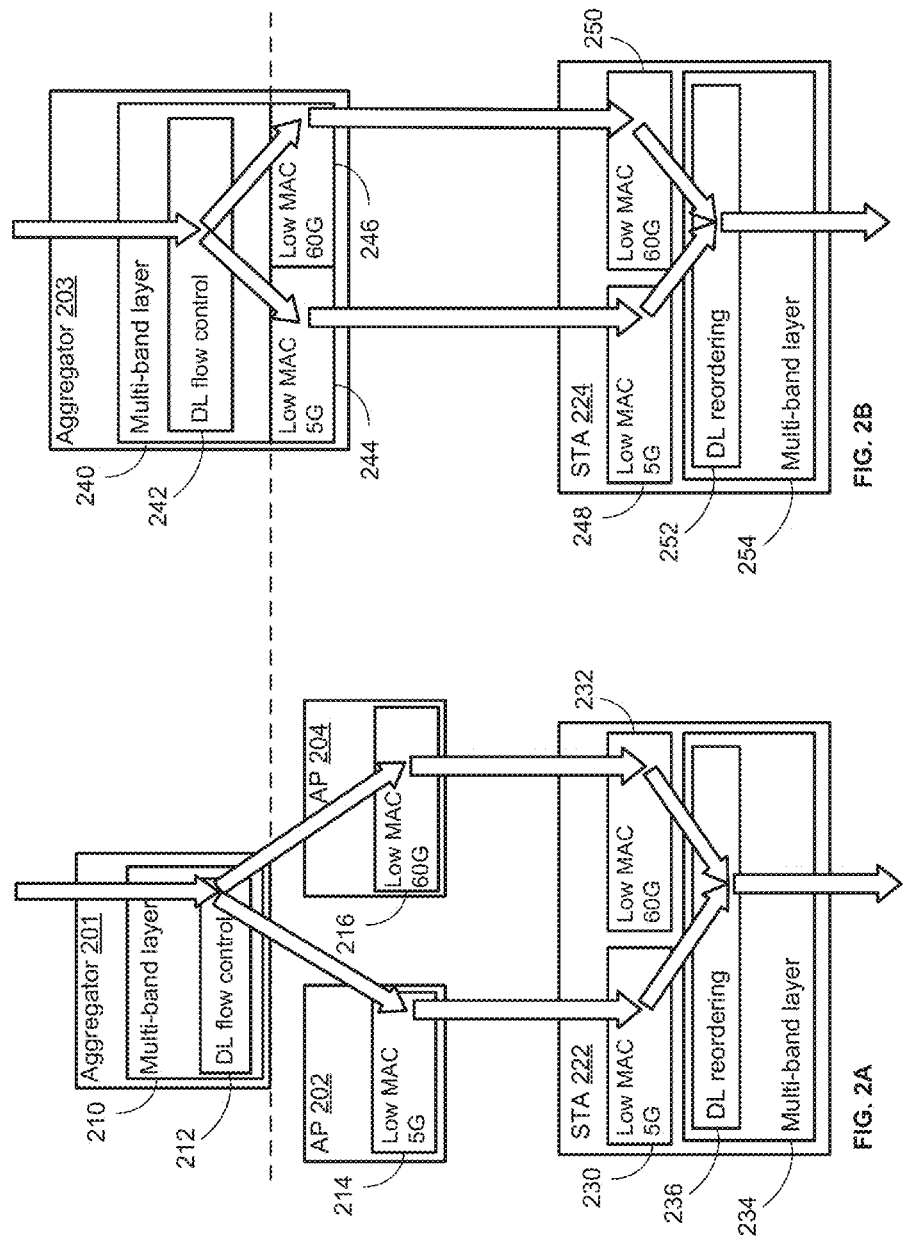
FIGS. 2A-2B illustrate aggregation and load-balancing, in accordance with one or more example embodiments of the present disclosure.

In one embodiment, and referring to the example of FIG. 2, a load-balancing of the one or more streams may be implemented by the link aggregation system such that the packets are evenly distributed between the one or more interfaces or maybe one interface is favored over another interface based on traffic and network conditions. It may be also possible to customize the load-balancing of the one or more streams based on preferences associated with a particular standard, a system administrator, a network administrator, a user preference, or any other customization.

The STA 324 may split the streams of packets 304, 306, 308, and 310 between two interfaces, interface 330 and interface 332, into two streams. For example, interface 330 may send packets 304 and 308 to STA 326, and interface 332 may send packets 306 and 310 to STA 326. Similarly, on the STA 326, there may be two interfaces, interface 334, and interface 336 that may receive the two streams coming from the STA 324. For example, interface 334 may receive packets 306 and 310, and interface 336 may receive packets 304 and 308. The packets 304, 306, 308, and 310 may be merged from the different interfaces and reordered. The packets may then be delivered in the original order to the higher layers. It should be noted that the lower MAC and PHY on each of the links can in some embodiments operate independently of each other. Balancing the flow only on one of the two or more links is an example embodiment of such a use case.

In one embodiment, a link aggregation system may facilitate management functions that may allow two communicating devices to determine that they have matching simultaneous multi-band operating capabilities, in accordance with some embodiments.

In one embodiment, a link aggregation system may facilitate techniques for enabling an STA to be associated and/or authenticated with two or more APs simultaneously and/or conduct a single association and/or authentication flow apply for two or more APs.

In one embodiment, a link aggregation system may facilitate management functions that allow communicating STAs to agree to load-balance traffic across two or more channels, in accordance with some embodiments. For example, in some embodiments, both the STAs may in addition operate in each of the channels independently.

In one embodiment, a link aggregation system may provide control functions to enable and disable operation of the load-balanced link, in accordance with some embodiments. Such embodiments can involve dynamically switching in or out of the second or subsequent interfaces while data transfer is in progress. In one embodiment, a link aggregation system may provide mechanisms to expose a single MAC address for the load-balanced (aggregated) link even though the traffic is distributed among multiple physical devices, each having their own MAC address. A single MAC address may be presented to the higher layer so that the load-balanced link is treated by the higher layers as a single logical link by which the destination is reached. This MAC address may be different from the MAC addresses used on the individual channels. Alternatively, the MAC address exposed to the higher layers may be the same as that used on one of the channels (or all, if all channels use the same MAC address, e.g., in the collocated scenario). Different packet formats may be determined to accommodate the different MAC address assignment options.

Fast Session Transfer (FST) defined in IEEE 802.11ad may define a transparent solution for embodiments where both STAs expose one MAC-SAP (and hence one MAC address is used for both links on each STA) and a non-transparent FST solution for embodiments where at least one device exposes two MAC-SAPs, i.e., one for each STA (and different MAC addresses for different links). FST can also enable, in some embodiments, simultaneous use of two links for transport of different streams on different links. In some embodiments, however, FST may not provide a solution for distributing packets (load-balancing) of a single stream to multiple bands/links.

Embodiments described herein provide improved techniques for establishing a single data plane link aggregation across collocated/non-collocated multiple band devices, for example, by expanding FST in order to enable distribution of a stream on multiple bands/links. In some embodiments, the MAC frame exchange can be defined to negotiate the parameters of a multi-band link aggregation (MB-LA) session.

In some embodiments, two devices that want to establish MB-LA may exchange multi-band link aggregation capabilities using one or multiple multi-band elements in accordance with some embodiments. This element may define the MB-LA general capabilities and operation parameters, such as operating band, priorities, acknowledgment characteristics, etc.

In another embodiment, the devices may exchange MB-LA setup frame requests (MB-LA-Req) and responses (MB-LA-Rsp) in accordance with some embodiments, for example, to establish a session across multiple bands and negotiate the parameters of a specific MB-LA session. This MB-LA stream element can involve one or more of the following: (1) map a traffic identifier (TID) in some embodiments; (2) provide direction to an MB-LA stream identifier (ID) in some embodiments; (3) define on which operating bands/channels this MB-LA stream can be steered in some embodiments; (4) define specific MB-LA acknowledgment characteristics in some embodiments; (5) define the MB-LA priority and QoS characteristics in some embodiments; and (6) define MB-LA related feedback in some embodiments.

Embodiments described herein can improve multi-band operation by enabling link aggregation. For example, current multi-band solutions, such as FST, do not necessarily support simultaneous transmission of the same stream over different bands/channels.

However, embodiments described herein involving multi-band link aggregation have one or more improvements and advantages. These improvements may include improvements in the latency to establish link aggregation, reduction in the overhead of scanning frames and pre-association frames, and improvements in the quality of link aggregation, for example, by triggering link aggregation setup only when selective conditions are met. Other improvements may include (1) throughput optimizations by reducing overhead, such that data may be aggregated and sent in a more efficient way; (2) latency optimizations by reducing the system delays, such that a packet may be sent in the next TXOP regardless of the band; (3) reduce system load, by reducing the collision ratio since less PPDU is sent over the air; (4) improve context switching between bands; (5) power optimization due to less power for transmission of data; and (6) making multi-band operation transparent to the upper layer.

It is understood that the above descriptions are for purposes of illustration and are not meant to be limiting.

Figure 4A:
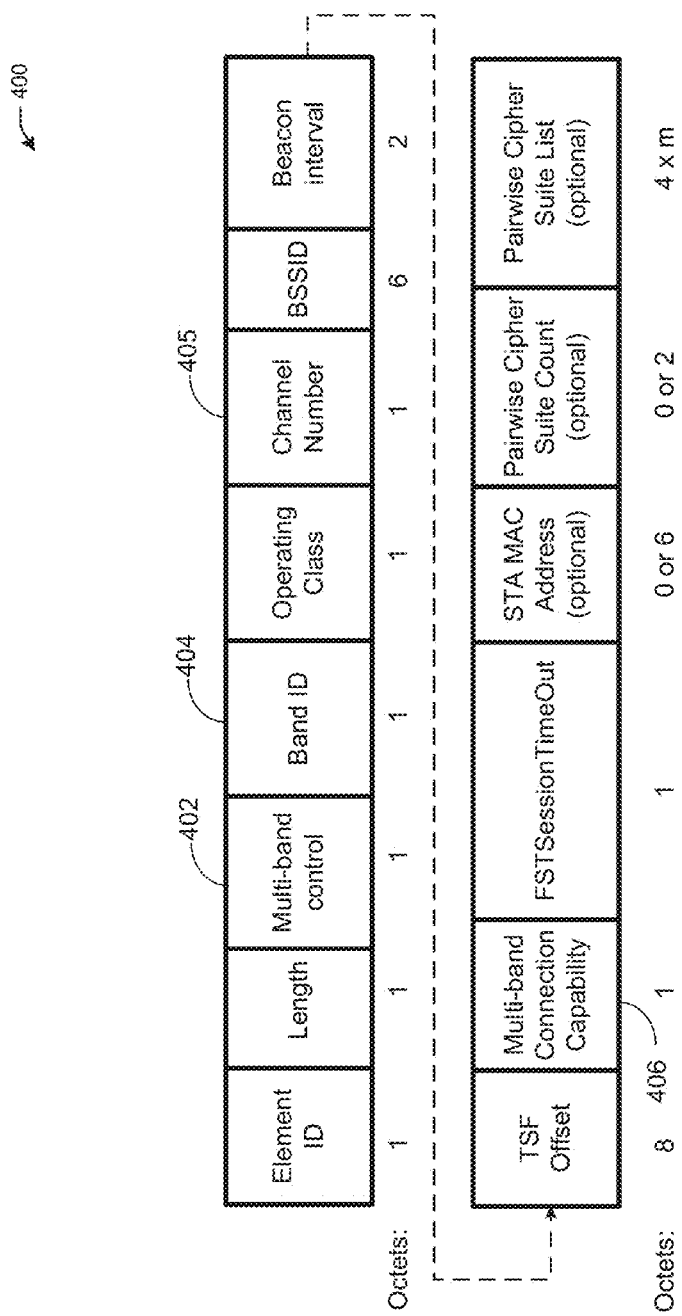
FIGS. 4A-4C illustrate frame structure formats, in accordance with one or more example embodiments of the present disclosure.
Figure 4B:
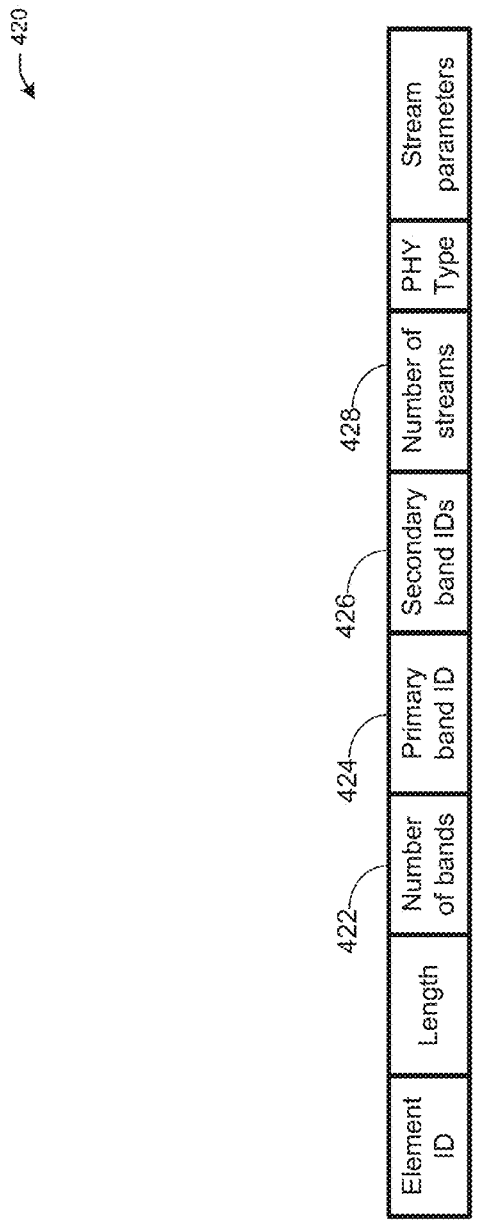
Figure 4C:
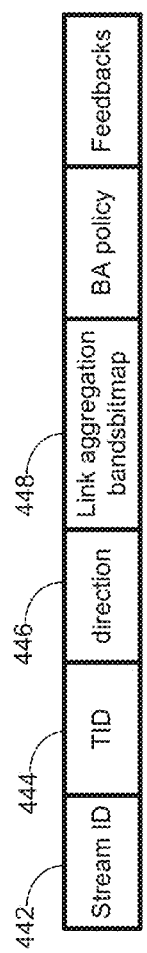

FIGS. 4A-4C illustrate frame structure formats, in accordance with one or more example embodiments of the present disclosure.

Referring to FIG. 4A, there is shown a frame 400 associated with a multi-band element associated with a link aggregation system. Frame 400 may include at least in part an element ID field, a length field, a multi-band control field 402, a band ID field 404, an operating class field, a channel number field 405, a BSSID field, a beacon interval field, a TSF offset field, a multi-band connection capability field 406, an FSTSessionTimeOut field, an STA MAC address (optional), a pairwise cipher suite count (optional), and a pairwise cipher suite list (optional).

This multi-band element may be included in beacons and pre-association frames to indicate support for multi-band aggregation (e.g., field 406) and the parameters to identify the band/channel (e.g., fields 404 and 405). For example, the multi-band element may be used by devices that are multi-band enabled and that support either FST or link aggregation or both.

In one embodiment, a link aggregation system may facilitate the exchange of capabilities between devices using the multi-band element. For example, the devices may define on which band they can operate, and the parameters and capabilities related to link aggregation and FST support. In one embodiment, a multi-band element may include information associated with (1) the capability for link aggregation in some embodiments; (2) the capability for FST in some embodiments; (3) the number of bands/air interfaces supported for link aggregation in some embodiments; and (4) the capability for a block acknowledgment (BA) per band/air interface or the capability for a BA across bands in some embodiments. These additional fields may use an extension ID to an existing information element associated with FST in order to indicate the presence of the additional fields.

In some embodiments where an existing multi-band element may be used, at least one multi-band element per band/channel can be supported. In some embodiments, such capabilities may not be specific to a specific band/channel but can be capabilities across bands, and can be repeated on each multi-band element. An alternative in some embodiments can be to include these new capabilities in another information element. A multi-band enabled device can in some embodiments support either FST or LA (link aggregation) or both FST and LA (for example, FST may then be defined as part of LA).

Embodiments can define two new action frames, for example, to be used to set up link aggregation. Such two new action frames can, in some embodiments, be an LA setup request frame and an LA setup response frame.

Embodiments described herein also include the exchanges of LA setup request and response frames, for example, between two devices that support link aggregation. Such embodiments can facilitate establishment of a session across multiple bands and can negotiate the parameters of this session. Embodiments described herein can also define a link aggregation stream element, an element that is included in the LA setup request and response frames. The link aggregation stream element may include one or more of the following parameters: (1) a mapping of a traffic identifier and direction pair to a stream ID; (2) information on whether the stream may be sent on one, two or more bands and which bands; (3) information on whether the block acknowledgments (BAs) may be sent on one, two or more bands, and which bands; or (4) information on whether the recipient may need to send regular feedbacks to the originator to optimize the load-balancing function and the type of feedback.

It is possible in some embodiments for the recipient of a link aggregation setup request to negotiate the link aggregation session parameters. In some embodiments, to do such negotiation, the responder can indicate its desired parameters in the link aggregation stream element included in the link aggregation setup response. The initiator and the responder of the link aggregation setup request and response may continue sending the messages in some embodiments that include their desired parameters, for example, until sending the link aggregation setup response with the status code set to "success."

It is understood that the above descriptions are for purposes of illustration and are not meant to be limiting.

Referring to FIG. 4B, there is shown a link aggregation stream element 420 associated with a link aggregation system. The link aggregation stream element may include at least part an element ID field, a length field, a number of bands field 422, a primary band ID field 424, secondary band IDs field 426, a number of streams field 428, a PHY type field, and a stream parameters field. It should be understood that these elements may be modified in order to implement one or more embodiments of the link aggregation system.

In some embodiments, the number of bands field 422 may indicate the number of bands that are supported, including the sum of one primary band and secondary band(s). In some embodiments, the primary band/channel ID 424 may indicate the band and/or channel ID corresponding to the primary band. The primary band band/channel may in some embodiments be defined to be the band/channel on which the multi-band operation falls back to a single band operation.

In some embodiments, the secondary band/channel IDs 426 may indicate the band and channel ID corresponding to the secondary band. The secondary bands may in some embodiments be defined to be the bands that are used for link aggregation and the streams may be load-balanced among them. For example, if the number of bands equal N, where N is an integer, there may be N−1 secondary band/channel ID fields 426 included in the multi-band element.

In some embodiments, the number of streams field 428 can indicate the number of streams for which parameters are provided.

Referring to FIG. 4C, there is shown an example of stream parameters 440, in accordance with various embodiments. The stream parameters 440 may include, at least in part, a stream ID field 442, a TID field 444, a direction field 446, a link aggregation bands bitmap field 448, a block acknowledgment (BA) policy field, and a feedbacks field.

In some embodiments, there may be as many stream parameter fields 440 as the number indicated in the previous field (number of streams field 428 of FIG. 4B). A stream ID field 442 can optionally be present in various embodiments, for example, if a stream ID is different from the TID (otherwise there may just be a TID field).

In some embodiments, the TID and direction can characterize the streams. For example, in some embodiments, if a TID is from 0 to 7, there can be a direct mapping of all flows coming from the higher layers to these TIDs, and all such traffic can be treated by link aggregation as indicated in this element.

A link aggregation bands bitmap 448 may in some embodiments be a field that has as many bits as the number of bands/channels that are supported and indicated as a specific band/channel ID in the multi-band elements. For example, in some embodiments, a link aggregation bands bitmap 448 may have one or more of the following characteristics: (1) the bitmap length can be fixed in some embodiments and may be longer than the maximum number of links that can be aggregated (and not all bands/channels are available); (2) based on a multi-band element, each supported band/channel can have a band/channel ID in some embodiments, and each bit of the bitmap can correspond to one supported band/channel ID in various embodiments; (3) if there are fewer band/channel IDs than available bits, the remaining bits can in some embodiments be set to zero, and for example, the first bit can correspond to a primary band/channel, a second bit can correspond to the first secondary band/channel, etc.

A bit corresponding to a band/channel may be set to one to indicate that the stream may be sent on this band/channel air interface in accordance with some embodiments, and it may be set to zero to indicate that it cannot in some embodiments be transmitted on this band/channel.

In some embodiments, a block acknowledgement (BA) policy may indicate if a BA may be sent. For example, a BA policy may determine whether a BA should be sent on a per band or air interface or for all packets sent from any band or air interface. The BA sent on one band/channel may acknowledge packets that have been transmitted on another band/channel. In some embodiments, a bitmap can also be included to indicate the bands on which the BA can be sent.

In some embodiments, the feedback(s) may indicate if one or more feedback(s) are needed and the types of feedback(s) that may be sent for load-balancing (e.g., RSSI, throughput, latency, link on/off).

In some embodiments, other fields may be added to indicate/negotiate exchanges that can be done during the link aggregation operation (e.g., once it is established).

It is understood that the above descriptions are for purposes of illustration and are not meant to be limiting.

Figure 5A:
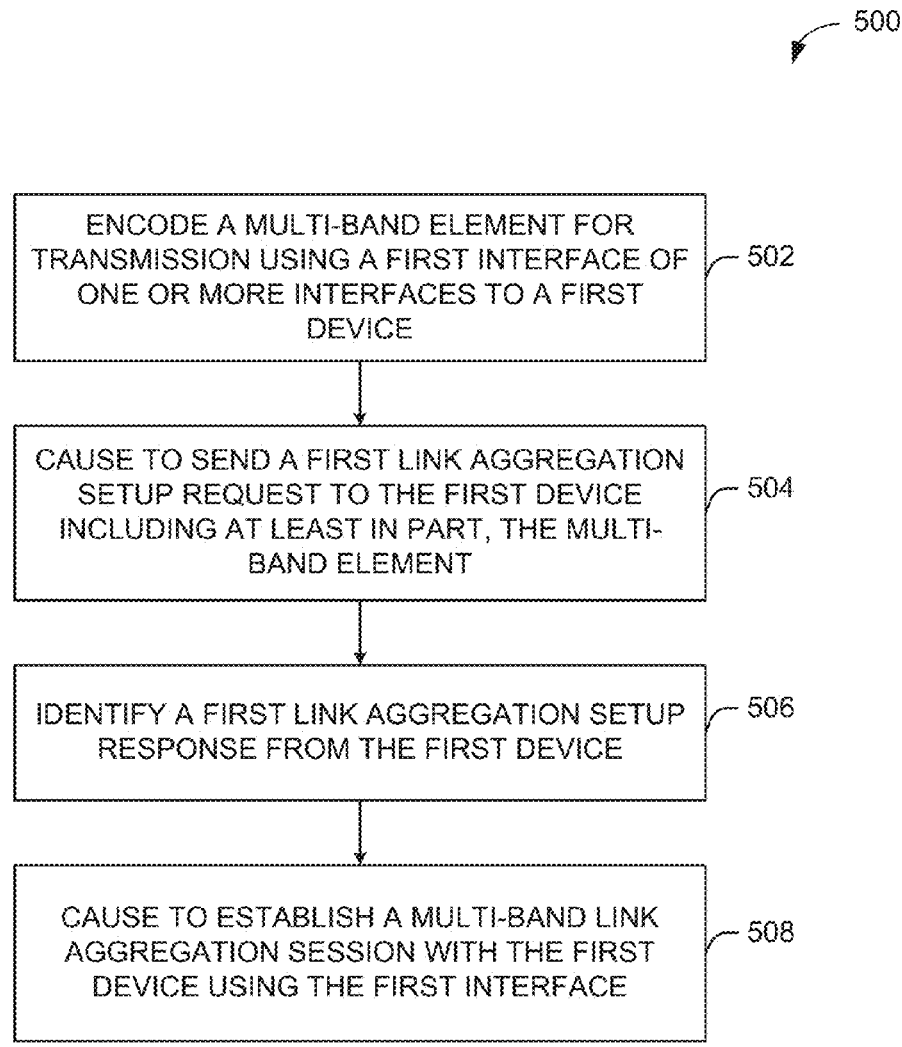
FIG. 5A depicts a flow diagram of an illustrative process for an illustrative link aggregation system, in accordance with one or more example embodiments of the present disclosure.

FIG. 5A illustrates a flow diagram of an illustrative process 500 for an illustrative link aggregation system, in accordance with one or more example embodiments of the present disclosure.

At block 502, a device (e.g., the STA 222 of FIG. 2) may encode a multi-band element for transmission using a first interface of one or more interfaces to a first device. For example, the first device may be an AP 202 of FIG. 2. The STA 222 may determine a multi-band element that may define on which band the STA 222 can operate, and the parameters and capabilities related to link aggregation and FST support. The multi-band element may include information associated with (1) the capability for link aggregation in some embodiments; (2) the capability for FST in some embodiments; (3) the number of bands/air interfaces supported for link aggregation in some embodiments; and (4) the capability for BA per band/air interface or the capability for BA across bands in some embodiments. These additional fields may use an extension ID to an existing information element associated with FST in order to indicate the presence of the additional fields. In some embodiments where an existing multi-band element may be used, at least one multi-band element per band/channel can be supported. In some embodiments, such capabilities may not be specific to a specific band/channel but can be capabilities across bands, and can be repeated on each multi-band element. An alternative in some embodiments can be to include these new capabilities in another information element. A multi-band enabled device can in some embodiments support either FST or link aggregation or both FST and link aggregation.

At block 504, the STA 222 may cause to send a first link aggregation setup request to the first device including at least in part the multi-band element. For example, the STA 222 may encode the multi-band element in a link aggregation setup request frame that may include one or more parameters that may assist the STA 222 and the AP 202 to negotiate parameters of a multi-band link aggregation session. The link aggregation stream element may include one or more of the following parameters: (1) a mapping of a traffic identifier and direction pair to a stream ID; (2) information on whether the stream may be sent on one, two or more bands and which bands; (3) information on whether the block acknowledgments (BAs) may be sent on one, two or more bands, and which bands; or (4) information on whether the recipient may need to send regular feedbacks to the originator to optimize the load-balancing function and the type of feedback.

At block 506, the STA 222 may identify a first link aggregation setup response from the first device. For example, the AP 202 may respond to the STA 222 with a link aggregation setup response that may include responses to some of the information requested by the link aggregation setup request. It is possible in some embodiments for the recipient (e.g., the AP 202) of a link aggregation setup request to negotiate the link aggregation session parameters. In some embodiments, to do such negotiation, the AP 202 may indicate its desired parameters in the link aggregation stream element included in the link aggregation setup response. The STA 222 and the AP 202 of the link aggregation setup request and response may continue sending messages that include their desired parameters, for example, until sending the link aggregation setup response with the status code set to "success."

At block 508, the STA 222 may cause to establish a multi-band link aggregation session with the first device using the first interface. For example, the STA 222 and the AP 202 may exchange the link aggregation setup request and response to establish a session across multiple bands and negotiate the parameters of a specific multi-band link aggregation session. The STA 222 may perform similar steps in order to negotiate multi-band communication with a second AP (e.g., the AP 204 of FIG. 2). The multi-band communication session established with the AP 202 will also include the AP 204, such that the AP 202 and the AP 204 may coordinate the packet transmissions with the STA 222. The AP 202 and the AP 204 may be associated with different frequency bands, or different channels, or different interfaces. The STA 222 may have one or more interfaces that are used by the STA 222 in order to communicate with the AP 202 and the AP 204 during the multi-band communication session. It is understood that the above descriptions are for purposes of illustration and are not meant to be limiting.

Figure 5B:
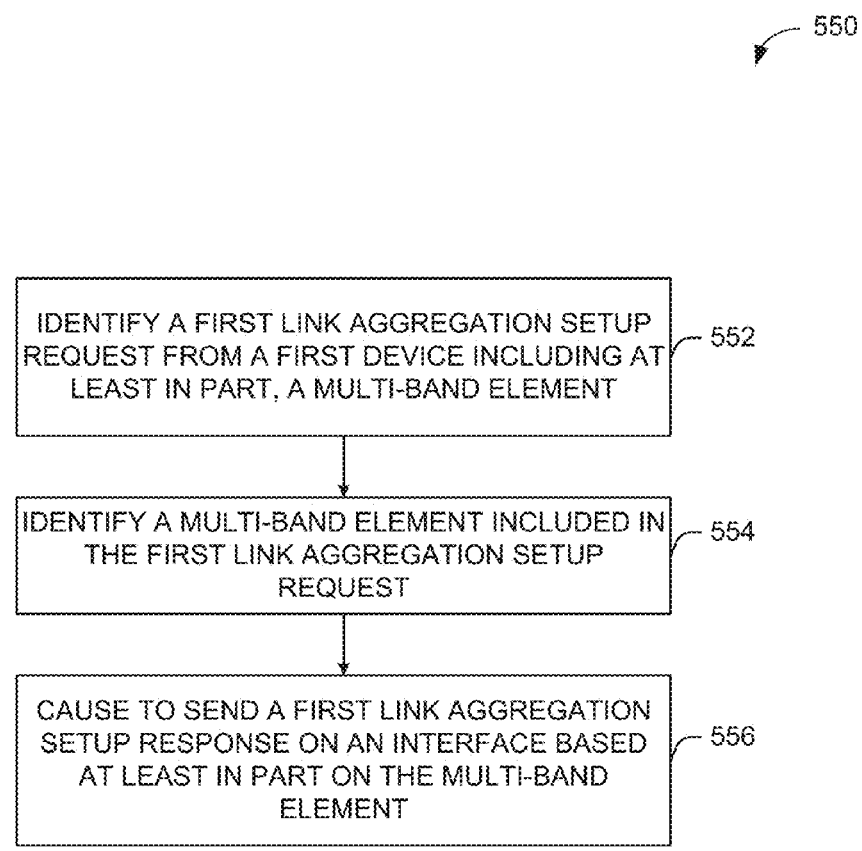
FIG. 5B depicts a flow diagram of an illustrative process for an illustrative link aggregation system, in accordance with one or more example embodiments of the present disclosure.

FIG. 5B illustrates a flow diagram of an illustrative process 550 for an illustrative link aggregation system, in accordance with one or more example embodiments of the present disclosure.

At block 552, a device (e.g., the AP 202 of FIG. 2) may identify a first link aggregation setup request from a first device including at least in part a multi-band element. For example, the AP 202 may receive a link aggregation setup request from an STA 222 of FIG. 2 in order to establish a multi-band link aggregation session. The multi-band link aggregation session may include communication between the STA 222, the AP 202, and another AP (e.g., the AP 204).

At block 554, the AP 202 may identify a multi-band element included in the first link aggregation setup request. For example, the AP 202 may decode or otherwise extract from the first link aggregation setup request, the multi-band element. The multi-band element may include information associated with (1) the capability for link aggregation in some embodiments; (2) the capability for FST in some embodiments; (3) the number of bands/air interfaces supported for link aggregation in some embodiments; and (4) the capability for BA per band/air interface or the capability for BA across bands in some embodiments. These additional fields may use an extension ID to an existing information element associated with FST in order to indicate the presence of the additional fields. In some embodiments where an existing multi-band element may be used, at least one multi-band element per band/channel can be supported. In some embodiments, such capabilities may not be specific to a specific band/channel but can be capabilities across bands, and can be repeated on each multi-band element. An alternative in some embodiments can be to include these new capabilities in another information element. A multi-band enabled device can in some embodiments support either FST or link aggregation or both FST and link aggregation.

At block 556, the AP 202 may cause to send a first link aggregation setup response on an interface based at least in part on the multi-band element. For example, the STA 222 and the AP 202 may exchange the link aggregation setup request and response to establish a session across multiple bands and negotiate the parameters of a specific multi-band link aggregation session. The STA 222 may perform similar steps in order to negotiate multi-band communication with the AP 204. The multi-band communication session established with the AP 202 will also include the AP 204, such that the AP 202 and the AP 204 may coordinate the packet transmissions with the STA 222. The AP 202 and the AP 204 may be associated with different frequency bands, or different channels, or different interfaces. The STA 222 may have one or more interfaces that are used by the STA 222 in order to communicate with the AP 202 and the AP 204 during the multi-band communication session.

Figure 6:
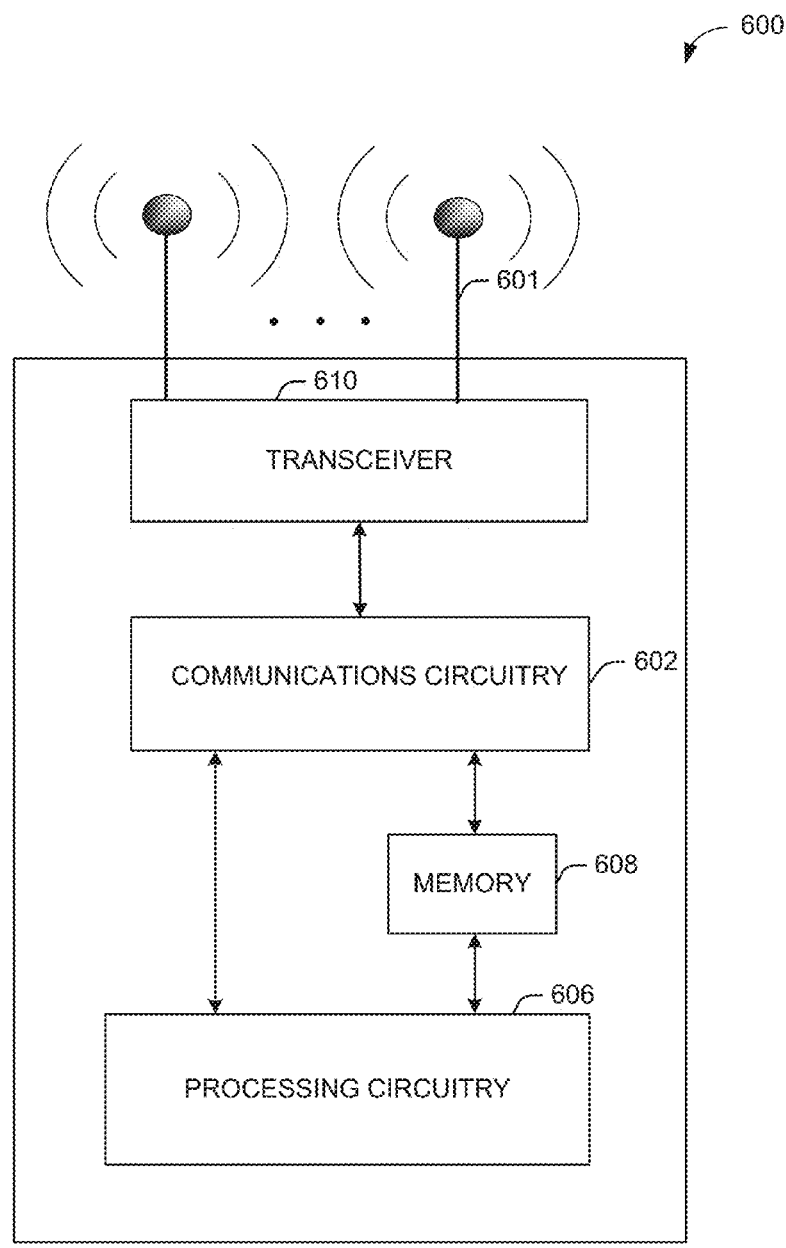
FIG. 6 illustrates a functional diagram of an example communication station that may be suitable for use as a user device, in accordance with one or more example embodiments of the present disclosure.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a station 104 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The communications circuitry 602 may include circuitry that can operate the physical layer (PHY) communications and/or media access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in FIGS. 2A-2B, 3, 4A-4C, and 5A-5B.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

Figure 7:
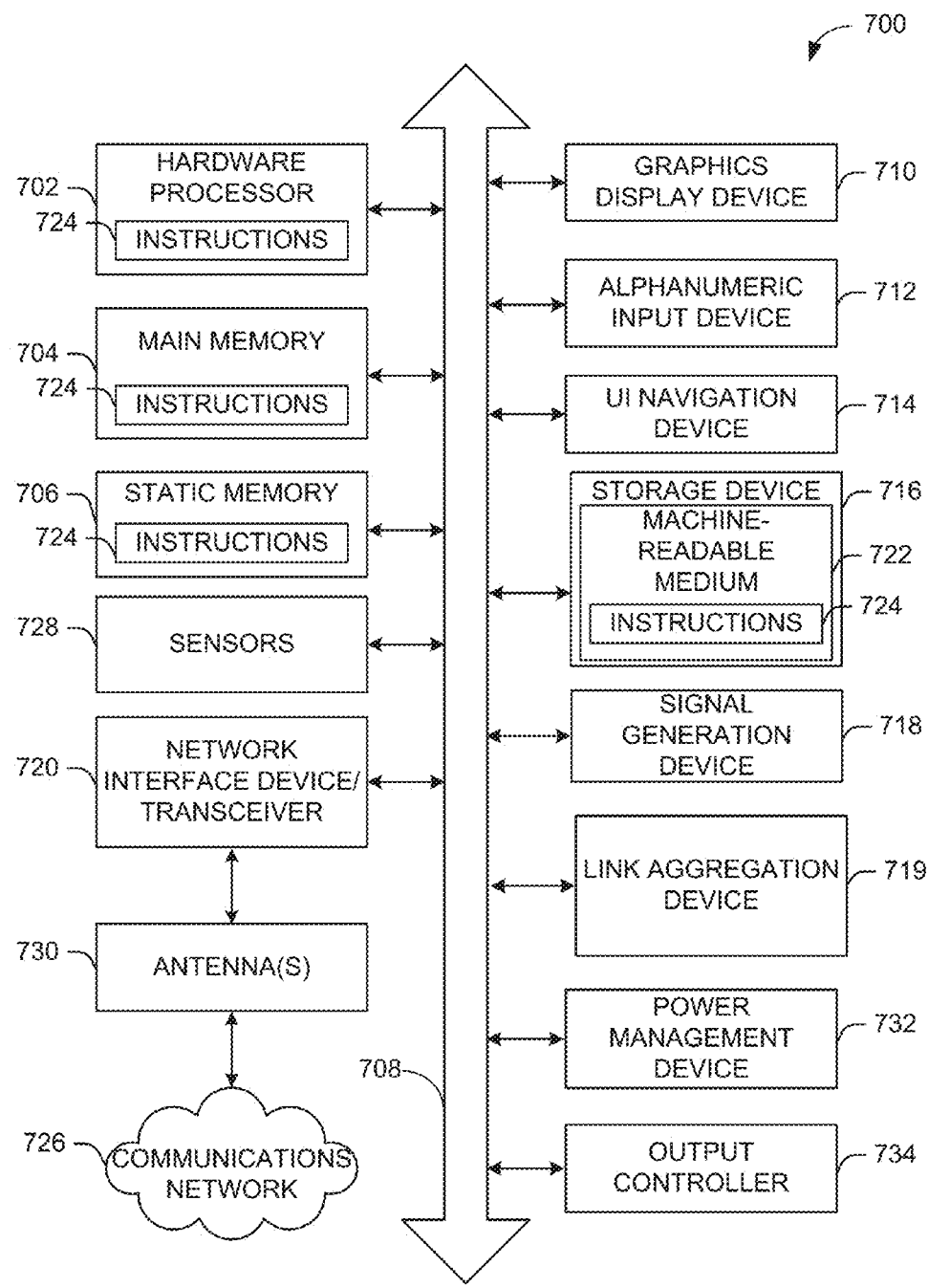
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a link aggregation device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The link aggregation device 719 may carry out or perform any of the operations and processes (e.g., the processes 500 and 550) described and shown above. For example, the link aggregation device 719 may provide link aggregation of data planes between different wireless air interfaces on different frequency bands (2.4 GHz, 5 GHz, 60 GHz, and others). The link aggregation device 719 may load-balance the traffic over two or more channels/bands/air interfaces that are sufficiently separated in frequency to permit simultaneous, independent operation, and that are non-collocated (are in different devices) at least on one side of the link. Examples may include a 2.4 GHz band channel and a 5 GHz band channel, two 5 GHz band channels at opposite ends of the band, a 5 GHz band channel and a 60 GHz band channel, a 2.4 GHz band channel, a 5 GHz band channel and a 60 GHz band channel, or any other combination of channels, bands, or air interfaces.

The link aggregation device 719 may facilitate the splitting of data packets received into two streams of data packets. The two streams may be associated with two interfaces, such that each interface is associated with a specific frequency band. It should be noted that one interface may collect and/or accumulate two MAC entities that may be associated with a specific frequency band. This may be referred to as having L2 streams.

The link aggregation device 719 may facilitate load-balancing of the two L2 data streams such that packets are evenly distributed between the two interfaces or between the two L2 data streams on one interface or maybe one interface is favored over another interface based on traffic and network conditions. It may be also possible to customize the load-balancing of the two L2 data streams based on preferences.

The link aggregation device 719 may improve multi-band operation, by improving the selection of an optimal candidate AP, which may provide one or more improvements, such as improvements in the latency to establish link aggregation, reduction in the overhead of scanning frames and pre-association frames, and improvements in the quality of link aggregation, for example, by triggering link aggregation setup when selective conditions are met.

It is understood that the above are only a subset of what the link aggregation device 719 may be configured to perform and that other functions included throughout this disclosure may also be performed by the link aggregation device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a single input single output (SISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

According to example embodiments of the disclosure, there may be a device. The device may include memory and processing circuitry configured to encode a multi-band element for transmission using a first interface of one or more interfaces to a first device. The memory and processing circuitry may be further configured to cause to send a first link aggregation setup request to the first device including at least in part, the multi-band element. The memory and processing circuitry may be further configured to identify a first link aggregation setup response from the first device. The memory and processing circuitry may be further configured to cause to establish a multi-band link aggregation session with the first device using the first interface.

The implementations may include one or more of the following features. The memory and the processing circuitry are further configured to establish the multi-band link aggregation session with a second device using a second interface of the one or more interfaces. The first interface and the second interface are associated with at least one of a frequency band of 800 MHz, 2.4 GHz, 5 GHz, 45 GHz, 45 GHz, or 60 GHz. The first link aggregation setup response may include one or more parameters associated with the multi-band link aggregation session. The multi-band element may include multi-band link aggregation capabilities of the device. The memory and the processing circuitry are further configured to cause to send a second link aggregation setup request to the second device. The memory and processing circuitry may be further configured to identify second link aggregation setup response from the second device. The multi-band element is an extension of a fast session transfer (FST) frame. The memory and the processing circuitry are further configured to determine a first operating band or a first operating channel associated with the first device. The device may further include a transceiver configured to transmit and receive wireless signals. The device may further include one or more antennas coupled to the transceiver.

According to example embodiments of the disclosure, there may be a device. The device may include memory and processing circuitry configured to identify a first link aggregation setup request from a first device including at least in part, a multi-band element. The memory and processing circuitry may be further configured to identify a multi-band element included in the first link aggregation setup request. The memory and processing circuitry may be further configured to cause to send a first link aggregation setup response on an interface based at least in part on the multi-band element.

The implementations may include one or more of the following features. The memory and the processing circuitry are further configured to establish a multi-band link aggregation session based at least in part on the multi-band element. The first link aggregation setup response may include one or more parameters associated with a multi-band link aggregation session with the first device. The interface is associated with at least one of a frequency band of 800 MHz, 2.4 GHz, 5 GHz, 45 GHz, or 60 GHz. The one or more parameters include at least in part, a multi-band link aggregation capability. The memory and the processing circuitry are further configured to determine an operating band or an operating channel associated with the interface. The multi-band element is an extension of a fast session transfer (FST) frame.

According to example embodiments of the disclosure, there may be a non-transitory computer-readable medium storing computer-executable instructions which, when executed by a processor, cause the processor to perform operations. The operations may include encoding a multi-band element for transmission using a first interface of one or more interfaces to a first device. The operations may include causing to send a first link aggregation setup request to the first device including at least in part, the multi-band element. The operations may include identifying a first link aggregation setup response from the first device. The operations may include causing to establish a multi-band link aggregation session with the first device using the first interface.

The operations may further comprise establishing the multi-band link aggregation session with a second device using a second interface of the one or more interfaces. The first interface and the second interface are associated with at least one of a frequency band of 800 MHz, 2.4 GHz, 5 GHz, 45 GHz, or 60 GHz. The first link aggregation setup response may include one or more parameters associated with the multi-band link aggregation session. The multi-band element may include multi-band link aggregation capabilities of the device. The operations may further comprise causing to send a second link aggregation setup request to the second device. The operations may include identifying second link aggregation setup response from the second device. The multi-band element is an extension of a fast session transfer (FST) frame. The operations may further comprise determining a first operating band or a first operating channel associated with the first device.

According to example embodiments of the disclosure, there may be a non-transitory computer-readable medium storing computer-executable instructions which, when executed by a processor, cause the processor to perform operations. The operations may include identifying a first link aggregation setup request from a first device including at least in part, a multi-band element. The operations may include identifying a multi-band element included in the first link aggregation setup request. The operations may include causing to send a first link aggregation setup response on an interface based at least in part on the multi-band element.

The implementations may include one or more of the following features. The operations further comprise establishing a multi-band link aggregation session based at least in part on the multi-band element. The first link aggregation setup response may include one or more parameters associated with a multi-band link aggregation session with the first device. The interface is associated with at least one of a frequency band of 800 MHz, 2.4 GHz, 5 GHz, 45 GHz, or 60 GHz. The one or more parameters include at least in part, a multi-band link aggregation capability. The operations may further comprise determining an operating band or an operating channel associated with the interface. The multi-band element is an extension of a fast session transfer (FST) frame.

According to example embodiments of the disclosure, there may include a method. The method may include encoding a multi-band element for transmission using a first interface of one or more interfaces to a first device. The method may include causing to send a first link aggregation setup request to the first device including at least in part, the multi-band element. The method may include identifying a first link aggregation setup response from the first device. The method may include causing to establish a multi-band link aggregation session with the first device using the first interface. The method may further include establishing the multi-band link aggregation session with a second device using a second interface of the one or more interfaces.

The implementations may include one or more of the following features. The first interface and the second interface are associated with at least one of a frequency band of 800 MHz, 2.4 GHz, 5 GHz, 45 GHz, or 60 GHz. The first link aggregation setup response includes one or more parameters associated with the multi-band link aggregation session. The multi-band element includes multi-band link aggregation capabilities of the device. The method may further include causing to send a second link aggregation setup request to the second device. The method may include identifying second link aggregation setup response from the second device. The multi-band element is an extension of a fast session transfer (FST) frame. The method may further include determining a first operating band or a first operating channel associated with the first device.

According to example embodiments of the disclosure, there may include a method. The method may include identifying a first link aggregation setup request from a first device including at least in part, a multi-band element. The method may include identifying a multi-band element included in the first link aggregation setup request. The method may include causing to send a first link aggregation setup response on an interface based at least in part on the multi-band element.

The implementations may include one or more of the following features. The method may further include establishing a multi-band link aggregation session based at least in part on the multi-band element. The first link aggregation setup response includes one or more parameters associated with a multi-band link aggregation session with the first device. The interface is associated with at least one of a frequency band of 800 MHz, 2.4 GHz, 5 GHz, 45 GHz, or 60 GHz. The one or more parameters include at least in part, a multi-band link aggregation capability. The method may further include determining an operating band or an operating channel associated with the interface. The multi-band element is an extension of a fast session transfer (FST) frame.

In example embodiments of the disclosure, there may be an apparatus. The apparatus may include means for encoding a multi-band element for transmission using a first interface of one or more interfaces to a first device. The apparatus may include means for causing to send a first link aggregation setup request to the first device including at least in part, the multi-band element. The apparatus may include means for identifying a first link aggregation setup response from the first device. The apparatus may include means for causing to establish a multi-band link aggregation session with the first device using the first interface.

The implementations may include one or more of the following features. The apparatus may further include means for establishing the multi-band link aggregation session with a second device using a second interface of the one or more interfaces. The first interface and the second interface are associated with at least one of a frequency band of 800 MHz, 2.4 GHz, 5 GHz, 45 GHz, or 60 GHz. The first link aggregation setup response includes one or more parameters associated with the multi-band link aggregation session. The multi-band element includes multi-band link aggregation capabilities of the device. The apparatus may further include means for causing to send a second link aggregation setup request to the second device. The apparatus may include means for identifying second link aggregation setup response from the second device. The multi-band element is an extension of a fast session transfer (FST) frame. The apparatus may further include means for determining a first operating band or a first operating channel associated with the first device.

In example embodiments of the disclosure, there may be an apparatus. The apparatus may include means for identifying a first link aggregation setup request from a first device including at least in part, a multi-band element. The apparatus may include means for identifying a multi-band element included in the first link aggregation setup request. The apparatus may include means for causing to send a first link aggregation setup response on an interface based at least in part on the multi-band element.

The implementations may include one or more of the following features. The apparatus may further include means for establishing a multi-band link aggregation session based at least in part on the multi-band element. The first link aggregation setup response includes one or more parameters associated with a multi-band link aggregation session with the first device. The interface is associated with at least one of a frequency band of 800 MHz, 2.4 GHz, 5 GHz, 45 GHz, or 60 GHz. The one or more parameters include at least in part, a multi-band link aggregation capability. The apparatus may further include means for determining an operating band or an operating channel associated with the interface. The multi-band element is an extension of a fast session transfer (FST) frame.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising memory and processing circuitry configured to:
   encode a multi-band element for transmission using a first interface of one or more interfaces to a first device;
   cause to send a first link aggregation setup request to the first device including at least in part the multi-band element;
   identify a first link aggregation setup response from the first device; and
   cause to establish a multi-band link aggregation session with the first device using the first interface and a second interface of the one or more interfaces.

2. The device of claim 1, wherein the first interface and the second interface are associated with at least one of a frequency band of 800 MHz, 2.4 GHz, 5 GHz, 45 GHz, or 60 GHz.

3. The device of claim 1, wherein the first link aggregation setup response includes one or more parameters associated with the multi-band link aggregation session.

4. The device of claim 3, wherein the multi-band element includes multi-band link aggregation capabilities of the device.

5. The device of claim 1, wherein the multi-band element is an extension of a fast session transfer (FST) frame.

6. The device of claim 1, wherein the memory and the processing circuitry are further configured to determine a first operating band or a first operating channel associated with the first device.

7. The device of claim 1, further comprising a transceiver configured to transmit and receive wireless signals.

8. The device of claim 7, further comprising one or more antennas coupled to the transceiver.

9. A non-transitory computer-readable medium storing computer-executable instructions which when executed by one or more processors result in performing operations comprising:
   identifying a first link aggregation setup request from a first device including at least in part a multi-band element;
   identifying a multi-band element included in the first link aggregation setup request;
   causing to send a first link aggregation setup response using a first interface of one or more interfaces based at least in part on the multi-band element; and
   establishing a multi-band link aggregation session with the first device using the first interface and a second interface of the one or more interfaces.

10. The non-transitory computer-readable medium of claim 9, wherein the first link aggregation setup response includes one or more parameters associated with a multi-band link aggregation session with the first device.

11. The non-transitory computer-readable medium of claim 9, wherein the first interface is associated with at least one of a frequency band of 800 MHz, 2.4 GHz, 5 GHz, 45 GHz, or 60 GHz.

12. The non-transitory computer-readable medium of claim 10, wherein the one or more parameters include at least in part a multi-band link aggregation capability.

13. The non-transitory computer-readable medium of claim 9, wherein the operations further comprise determining an operating band or an operating channel associated with the first interface.

14. The non-transitory computer-readable medium of claim 13, wherein the multi-band element is an extension of a fast session transfer (FST) frame.

15. A method comprising:
   encoding a multi-band element for transmission using a first interface of one or more interfaces to a first device;
   causing to send a first link aggregation setup request to the first device including at least in part the multi-band element;
   identifying a first link aggregation setup response from the first device; and
   causing to establish a multi-band link aggregation session with the first device using the first interface and a second interface of the one or more interfaces.

16. The method of claim 15, wherein the first interface and the second interface are associated with at least one of a frequency band of 800 MHz, 2.4 GHz, 5 GHz, 45 GHz, or 60 GHz.

17. The method of claim 15, wherein the first link aggregation setup response includes one or more parameters associated with the multi-band link aggregation session.

18. The method of claim 17, wherein the one or more parameters include at least in part a multi-band link aggregation capability.

19. The method of claim 15, wherein the multi-band element is an extension of a fast session transfer (FST) frame.

20. The method of claim 15 further comprising:
 determining a first operating band or a first operating channel associated with the first device.

\* \* \* \* \*